United States Patent [19]
Iimura et al.

[11] Patent Number: 5,388,239
[45] Date of Patent: Feb. 7, 1995

[54] OPERAND ADDRESS MODIFICATION SYSTEM

[75] Inventors: Kenji Iimura, Hitachi; Sakae Miki, Komae; Shunji Shimada, Koganei; Michio Hara; Kenjirou Yasunari, both of Kodaira; Hiroshi Takahashi, Hitachi; Kenichi Kimura, Ohnojou; Akira Ikuta; Kenji Kawakita, both of Yokohama, all of Japan

[73] Assignee: Hitachi, Ltd., Tokyo, Japan

[21] Appl. No.: 668,717

[22] Filed: Mar. 12, 1991

Related U.S. Application Data

[63] Continuation of Ser. No. 277,263, Nov. 29, 1988, abandoned.

[30] Foreign Application Priority Data

Dec. 1, 1987 [JP] Japan ............................ 62-303958
Dec. 21, 1987 [JP] Japan ............................ 62-321203

[51] Int. Cl.⁶ .......................................... G06F 12/12
[52] U.S. Cl. ........................... 395/400; 364/DIG. 1
[58] Field of Search ............... 395/400, 425, 775, 200

[56] References Cited

U.S. PATENT DOCUMENTS

| | | | |
|---|---|---|---|
| 3,938,096 | 2/1976 | Brown et al. ............. | 395/400 |
| 4,366,536 | 12/1982 | Kohn .......................... | 395/425 |
| 4,654,789 | 3/1987 | Nusinov et al. ........... | 395/500 |
| 5,134,691 | 7/1992 | Elms .......................... | 395/200 |

OTHER PUBLICATIONS

*Digital Logic and Computer Design,* M. Morris Mano, Prentice-Hall, Inc., 1979, pp. 499-523.
Gill, Arthur, *Machine and Assembly Language Programming of the POP-II,* Chaps. 1-4, Prentice-Hall, Inc., 1983.
"Microcomputer Handbook", published by Ohmsha Co., Ltd., Dec. 25, 1985, pp. 774-775.

*Primary Examiner*—Rebecca L. Rudolph
*Attorney, Agent, or Firm*—Fay, Sharpe, Beall, Fagan, Minnich & McKee

[57] ABSTRACT

A system of adding an operand address included in an instruction word to the contents of a modification register to obtain an effective address, wherein address data which designates each of a plurality of data tables constituted with prescribed storage capacity, is stored in a plurality of modification registers. Prescribed address data of one of the plurality of modification registers is selected based on the instruction word. The effective address for addressing the operand is obtained by adding the prescribed address data of the one of the plurality of modification registers to address data included in the operand address. The address data included in the operand address designates addresses which correspond to addresses of the plurality of data tables.

5 Claims, 4 Drawing Sheets

OPERAND ADDRESS MODIFICATION SYSTEM

This is a continuation of copending application Ser. No. 07/277,263 filed on Nov. 29, 1988, abandoned.

BACKGROUND OF THE INVENTION

The present invention relates to an addressing system for a microprocessor and, more particularly, to an address modification system of instruction words, for example, to be applied to a communication protocol control LSI for a digital communication integrated network.

A digital communication integrated network, as described in "Microcomputer Handbook" p. 774 and p. 775, published in 25th Dec. 1985 by Ohmsha Co., Ltd., includes (1) an integrated service digital network (ISDN) where telephone, data, facsimile communication and various other sorts of communication processing services are integrated and provided in one digital communication network, and (2) an information network system (INS). In a switching station to which various sorts of terminal equipment is connected, a communication protocol control LSI for effecting communication processing between the station and prescribed terminal equipment is installed. In the communication protocol control LSI, when communication processing is started between the station and the prescribed terminal equipment, the function of accessing a data table is required for each terminal. Each data table should have data necessary for communication processing, such as data relating to sort of the terminal equipment or data related to communication speed. In the access of the communication protocol data table, since high speed processing is required, selection of the data may be effected through a branch instruction. In this case, a plurality of software steps such as loading of reference address data for varying the data table, adding processing of the displacement amount to the loaded reference and storing of the adding result are required.

However, in processing data through use of a branch instruction, high speed access of the communication protocol data table required in the communication protocol control LSI cannot be accomplished. Prior application U.S. Ser. No. 156,313 filed on Feb. 16, 1988, now U.S. Pat. No. 4,989,135, is related to a communication protocol control LSI.

SUMMARY OF THE INVENTION

An object of the invention is to provide an address modification system of instruction words which can access a predescribed one of a plurality of data tables at high speed.

The foregoing and other objects and novel features of the invention will be apparent from the description of the specification and the accompanying drawings.

An outline of the invention disclosed in the present application will be briefly described as follows:

A system of adding an operand address included in an instruction word to the contents of a modification register to obtain an effective address is disclosed. Address data, which designated each of a plurality of data tables respectively constituted by prescribed storage capacity, is stored in a plurality of modification registers. Prescribed address data of one of the plurality of modification register is selected based on the instruction word. The prescribed address data of one of the plurality of modification registers and the address data included in the operand address are subjected to an adding processing. The effective address for addressing the operand is thereby obtained. The address data included in the operand address designates addresses which correspond to addresses of a plurality of data tables.

According to the above-mentioned means, one instruction word having an address part is executed, thereby (1) selection of a modification register, and, (2) adding processing of address data held by the selected modification register and address data included in the instruction word are executed. Thereby, an effective address for addressing a desired data table is obtained, so that high speed access of the prescribed data table among a plurality of data tables is attained.

DESCRIPTION OF THE PREFERRED EMBODIMENTS

Figure 1:
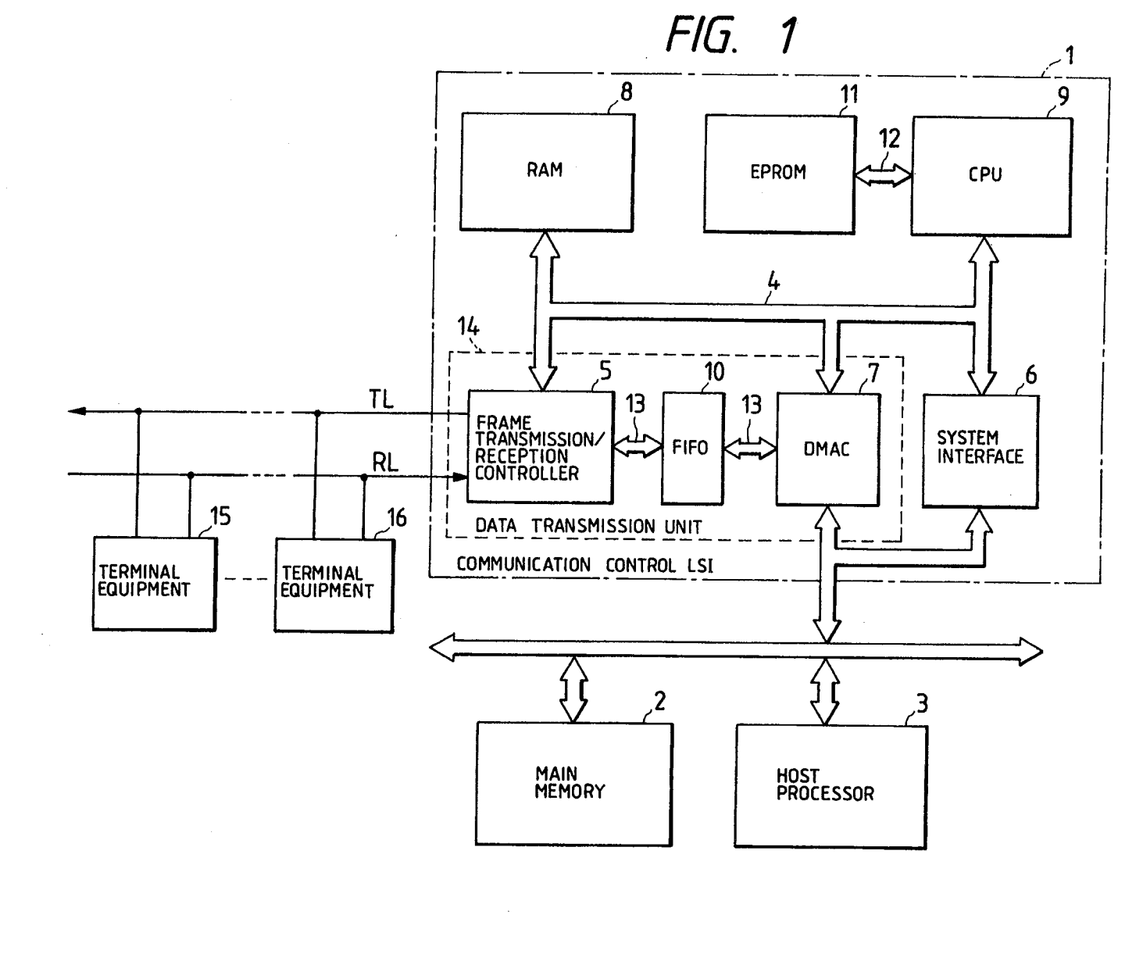
FIG. 1 is a block diagram of a system including a commnication control LSI as an embodiment of a communication controller according to the invention.

FIG. 1 is a block diagram of a system including a communication control LSI 1 as an embodiment of a communication controller to which the invention is applied. The communication control LSI 1 shown in FIG. 1, although not particularly limited thereto, is formed on one semiconductor substrate by known semiconductor integrated circuit manufacturing technology.

The communication control LSI 1 shown in FIG. 1, together with a main memory 2 and a host processor 3, constitutes a communication function module which aids data transmission control procedure and other control when data communication is performed with other communication function modules.

The following devices are connected to a common inner bus 4 of the communication control LSI 1: (1) a frame transmission/reception controller 5 installed as communication control means for effecting serial interface to a plurality of terminal equipment 15, 16 through a transmission line TL and a reception line RL, (2) a system interface 6 subjected to interface with the main memory 2 and the host processor 3 in the self station, (3) a DMAC (direct memory access controller) 7 for effecting data transfer directly to the main memory 2 or the like without passing through the system interface 6, (4) a RAM (random access memory) 8 for storing various sorts of control data a in rewritable state, such as a system constant required to perform the data transfer control, and (5) a central processing unit 9 for conducting control of the communication control LSI 1 as a whole.

During data reception frame transmission/reception controller 5 takes bit synchronization and character synchronization to series data received from the reception line RL, effects series/parallel conversion of data, effects prescribed operations to detect transmission errors, and commands prescribed interrupt processing to the central processing unit 9 corresponding to sort of the reception data or the reception frame. During data transmission, the data or the frame to be transmitted is subjected to parallel/series conversion, bit synchronization and character synchronization are taken, a code for detecting transmission errors is added and the data is transmitted from the transmission line TL.

The DMAC 7 effects data transmission control to store the prescribed field of the reception frame processed in the frame transmission/reception controller 5 in main memory 2, and also effects control to transfer the data stored in the memory 2 into the frame transmission/reception controller 5 so as to transmit it. Further, the DMAC 7 effects control to transfer various sorts of parameter or data for table constitution required for the communication protocol processing between the memory 2 and the RAM 8.

Although not particularly limited thereto, in data transfer based on control of the DMAC 7 effected between the frame transmission/reception controller 5 and the main memory 2, an exclusive DMAC transfer bus 13 is used to connect the DMAC 7 to the frame transmission/reception controller 5. Thereby when the data transfer between the frame transmission/reception controller 5 and the main memory 2 is performed by the access control of the DMAC 7, the common inner bus 4 is not occupied by the DMAC transfer. During the DMAC transfer, the central processing unit 9 can utilize the common inner bus 4 corresponding to necessity in the protocol processing.

A data buffer FIFO 10 of first-in first-out type, which absorbs or buffers the difference between data transfer speed of the DMAC 7 and the data transmission/reception speed of the frame transmission/reception controller 5 is installed between the frame transmission/reception controller 5 and the DMAC 7.

The system interface 6 is utilized when the host processor 3 transfers command to the communication control LSI 1 or reads status corresponding to the inner state of the communication control LSI 1.

A communication protocol processing program to specify the data transmission control procedure is entered in the communication control LSI 1. The communication protocol processing program is stored in an EPROM (erasable and programmable read only memory) 11, an example of a non-volatile semiconductor memory which can be rewritten. Consequently, the communication protocol processing program to be stored in the EPROM 11 is selected or varied if necessary. Thereby, the communication control LSI 1 is not limited to specific protocol, but desired data transmission control procedure can be entered corresponding to different sorts of protocol or variation of the protocol.

The EPROM 11 may be replaced by an EEPROM (electrically erasable and programmable read only memory) which can be rewritten electrically. When the EEPROM is adopted, the data transmission control procedure can be rewritten on the system. Consequently, when the frame transmission/reception controller 5 is utilized so that the link can be spread based on different protocol such as LAPB and LAPD (Link Access Procedure on D channel) and further other control procedure of HDLC series, the transmission control procedure which can be processed electrically is previously held to the outside of the communication control LSI, and if necessary, prescribed control procedure can be stored in the EEPROM. Further when the system is completed and subsequently the communication protocol is varied or corrected, the protocol processing program can be rewritten or corrected on the system corresponding to the variation.

The protocol processing program stored in the EPROM 11, although not particularly limited thereto, is constituted by a micro instruction group. In the micro instruction, although not particularly limited thereto, micro code and various sorts of information fields are formed in the bit number where various sorts of processing such as arithmetic calculation or data transfer can be executed in constant cycle or constant step number.

The EPROM 11 is accessed by the central processing unit 9, and a prescribed micro instruction read by this is supplied through an instruction exclusive bus 12 to the central processing unit 9.

The central processing unit 9, although not particularly limited thereto, contains a micro address controller for accessing the EPROM 11, a micro instruction decoder for decoding the micro instruction supplied from the EPROM 11, an execution unit for executing the micro instruction based on output control signal of the micro instruction decoder, a bus interface unit to the common inner bus 4, and an interrupt controller or the like, and executes the data transmission control in accordance with the prescribed communication protocol by the micro instruction supplied from the EPROM 11.

For example, in the EPROM 11, the communication protocol processing program for specifying the LAPD control procedure for the ISDN belonging to the HDLC control procedure series or corresponding control procedure is stored.

Figure 2:
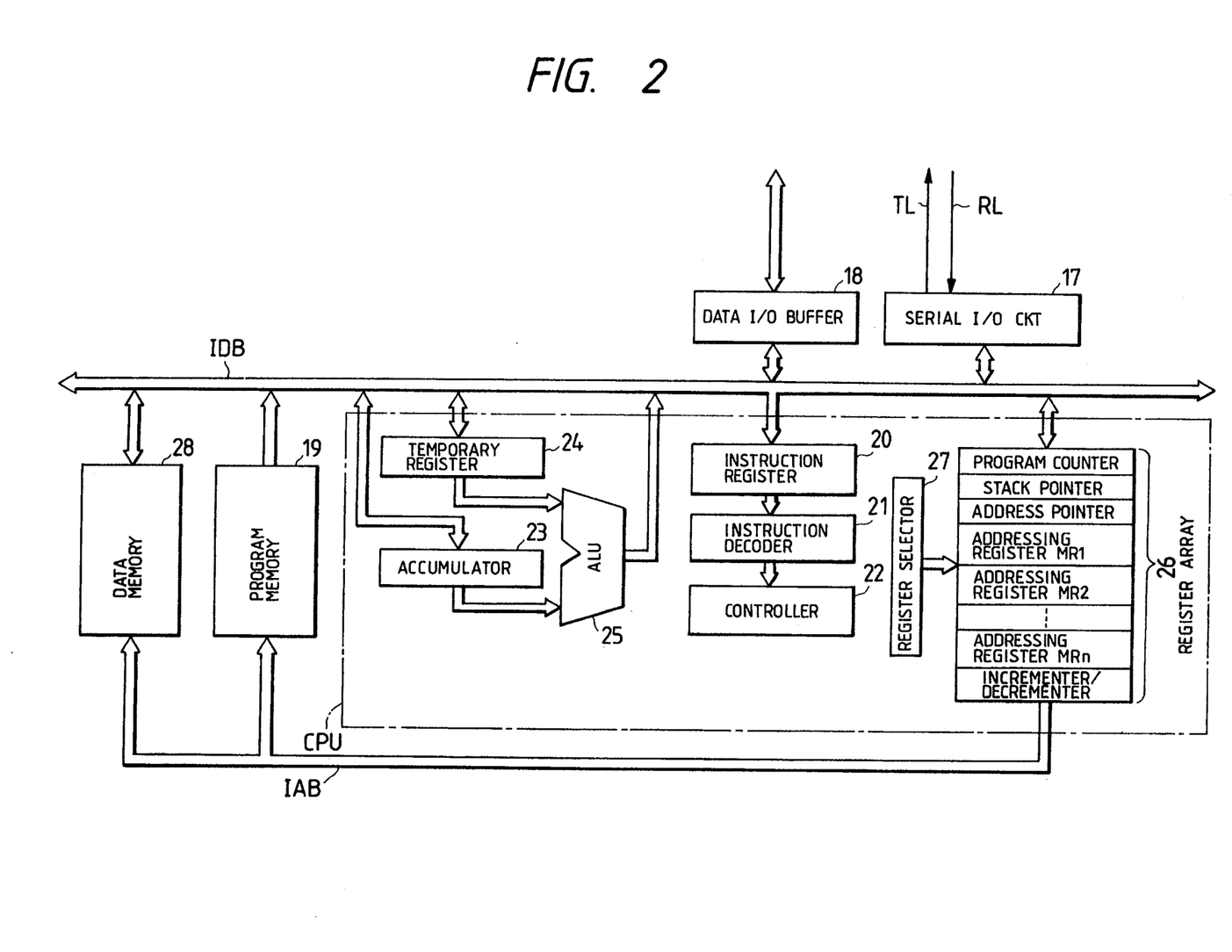
FIG. 2 is a block diagram illustrating the main part of a communication protocol control LSI as an embodiment of the invent ion.

FIG. 2 is a block diagram illustrating the main part of the communication control LSI to which the invention is applied. Each block shown in the embodiment corresponds substantially to each block of the communication control LSI shown in FIG. 1 as hereinafter described.

The communication protocol control LSI of the embodiment, although not particularly limited thereto, has a serial input/output circuit SI/O 17 contained in a switching station of the LSDN for taking interface with the communication lines TL and RL to which a plurality of terminal equipment 15, 16 shown in FIG. 1 such as a telephone, a facsimile, a display, a personal computer or the like are connected. The serial input/output circuit SI/O 17 corresponds to the frame transmission/reception controller 5 and the FIFO 10 in FIG. 1. Further the communication protocol LSI is connected through a data input/output buffer 18 to the host processor 3 or the like of the switching station as shown in FIG. 1. The data input/output buffer 18 corresponds to the DMAC 7 or the like in FIG. 1.

The communication protocol control LSI as an instruction control system is provided with (1) an instruction register 20 for fetching the instruction read from a program memory 19 to an inner data-bus IDB, (2) an instruction decoder 21 for decoding the instruction fetched to the instruction register 20, particularly the operation code, and (3) a controller 22 for supplying a control signal sequentially to each part based on the control data output from the instruction decoder 21. The program memory 19 corresponds to the EPROM 11 shown in FIG. 1. Also, in the operation execution system for executing the operation processing based on control of the instruction control system, an accumulator 23 in which data for operation or the operation result data is stored, a temporary register 24 to be used during the inner execution of instruction and an arithmetic logic unit ALU 25 are connected to the inner data bus IDB respectively. The part surrounded by the dash-and-dot line corresponds to the CPU 9 shown in FIG. 1.

In FIG. 2, a register array 26 is used for storing various sorts of control data and operation data required for instruction control and operation execution. In actual state, the register array 26 is comprised of a data memory or the like which can read or write the data of the prescribed bit number at high speed, and is connected to the inner data bus IDB. Selection of registers included in the register array is executed by a register selecter 27 which receives a control signal output from the controller 22.

The register array 26 includes the following various sorts of general-purpose registers and exclusive registers (1) a program counter for assigning the memory address of the program being executed in the present, (2) a stack pointer indicating the most significant digit of the stack region, (3) an address pointer assigning an address of a data memory 28, and (4) modification register group $MR_1, MR_2, \ldots, MR_n$ as hereinafter described in detail. The program counter, the stack pointer and the address pointer are connected through an output terminal of an incrementer/decrementer to an inner bus IAB. Address signal input terminal of the program memory 19 and address signal input terminal of the data memory 28 are also connected to the inner address IAB.

Figure 3:
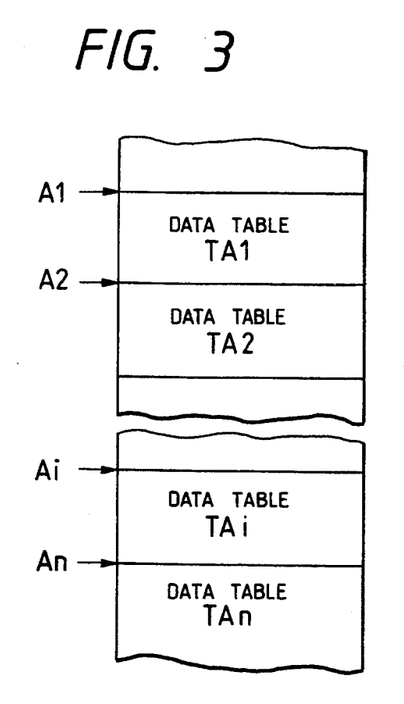
FIG. 3 and FIG. 6 are explanation diagrams of a data table.

In this case, the communication protocol control LSI of the embodiment holds data such as data relating to sort terminal equipment or data relating to the state of a line required when the communication processing is effected to a prescribed terminal equipment through the serial input/output circuit 17 in a protocol data table (hereinafter referred to simply as "data table") per each terminal equipment. The data table, as shown in FIG. 3, is formed as the n data tables $TA_1$ through $TA_n$ with equal storage capacity corresponding to the number of terminal equipment on the data memory 28. For example, each of respective data tables $TA_1$ through $TA_n$, although not particularly limited thereto, is constituted with addressable storage capacity by address data Bi of four bits. Sort of the data tables $TA_1$ through $TA_n$, although not particularly limited thereto, is distinguished by address data Ai of nine bits. The address data Ai of nine bits, although not particularly limited thereto, relates to the address space controlled directly by the communication protocol control LSI of the embodiment.

Addressing to the data tables $TA_1$ through $TA_n$ is executed by the effective address obtained in the system of modifying the address part included in the instruction word in accordance with content of the modification register group MR.

Figure 4:
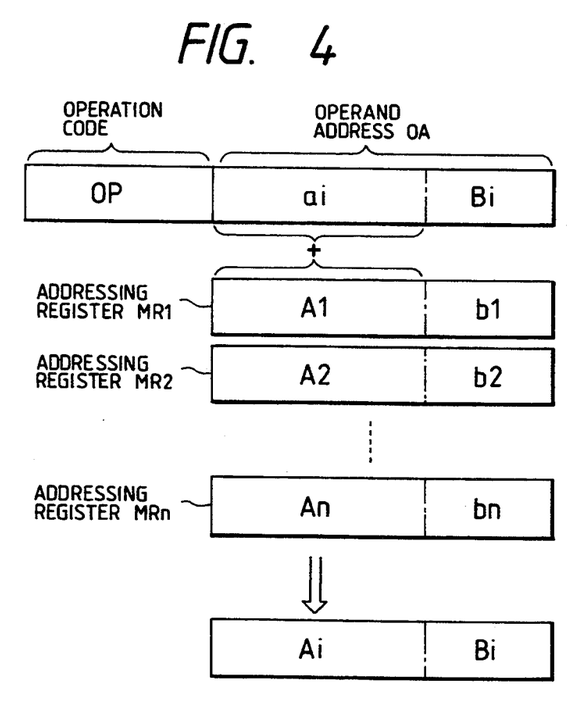
FIG. 4 is an explanation diagram of the processing of adding the operand address and the content of a modification register to obtain an effective address.

First, operand address OA included in the instruction word when the data table is accessed, although not particularly limited thereto, is comprised of 13 bits as shown in FIG. 4. The lower four bits of OA comprise address data Bi corresponding to the relative address within respective data tables and the upper nine bits ai are all set of zero, according to the embodiment. The modification register group MR is comprised of a set of the modification registers $MR_1$ through $MR_n$ of 13 bits which store the address data Ai of nine bits specifying sort of the data tables $TA_1$ through $TA_n$ in one-to-one correspondence to the terminal equipment (not shown) individually in the upper nine bits. The lower four bits of each of the modification registers $MR_1$ through $MR_n$, $b_1, b_2, \ldots, b_n$, are set of zero, respectively, according to the embodiment. However, the invention is not limited to the embodiment. Modification to the operand address data Bi need not be effected. Consequently, bit length of each of the modification registers $MR_1, MR_2, \ldots, MR_n$ may be constituted by bit length to store each address data $A_1, A_2, \ldots, A_n$. Although not particularly limited thereto, operation code OP of the instruction word includes codes of the prescribed bit number to select one of a plurality of modification registers $MR_1$ through $MR_n$.

When the communication protocol LSI effects communication processing through the serial input/output circuit 17 to the prescribed terminal equipment, in order to obtain data relating to sort of the terminal equipment or state of the line from prescribed one plurality of data tables $TA_1$ through $TA_n$, if a prescribed instruction is read from the program memory 19, the operation code OP of the instruction word is fetched to the instruction register 20. The fetched operation code 0P is decoded by the instruction decoder 21 and control signals corresponding to the content is supplied through the controller 22 to each part.

The operand address OA included in the instruction word is stored in the temporary register 24. Such operand address OA, according to the embodiment, includes prescribed address data Bi corresponding to the relative address which is common within respective data tables in the lower four bits, which, and the upper nine bits are the address data set to zero. The operation code OP includes code to select one modification register $MR_i$ among the modification registers $MR_1$ through $MR_n$. In accordance with the code, the modification register $MR_i$ is selected by operation of the register selecter 27 based on the output control signal output from the controller 22. In the address data output from the selected modification register $MR_i$, the address data Ai to assign the data table $TA_1$ is included in the upper nine bits. The lower four bits are set of zero and transferred to the accumulator 23. The data transferred to the accumulator 23 may be the address data Ai only. Because the address data Ai is substantially the object of operation in the arithmetic logic unit ALU. The address data stored in the accumulator 23 and the operand address OA stored in the temporary register 24 are subjected to an adding processing by the arithmetic logic unit ALU. The effective address for accessing the data table $TA_i$ is obtained where the address data Ai to designate the data table $TA_i$ is included in the upper nine bits, and the prescribed address data Bi corresponding to the relative address common within respective data tables is included in the lower four bits. Since the address data Bi is not an object of the adding operation the effective address for accessing the data table $TA_i$ can be obtained at high speed. Effective address data is supplied through the address pointer AP to the data memory DTM, thereby the data table $TA_1$ included in the data memory DTM is accessed, and data for controlling the prescribed communication protocol is read as an operand required for the communication processing to the prescribed terminal equipment during the execution of the instruction word.

Figure 5A:
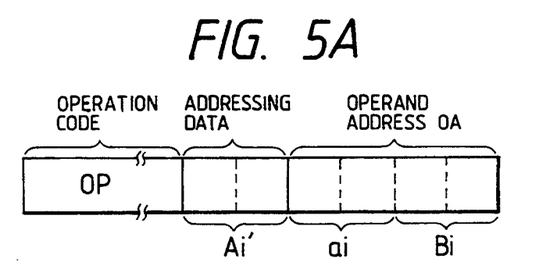
FIGS. 5A, 5B and 5C are explanation diagrams of another embodiment of an address modification system according to the invention.
Figure 6:
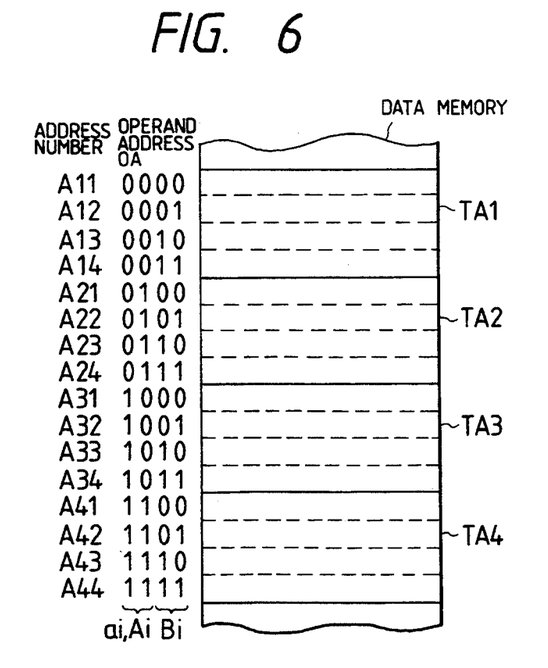

FIG. 5A shows another embodiment of instruction format when the data table is accessed. The instruction format includes the operand address OA together with modification data Ai' to modify a partial address data ai in the operand address OA. In the embodiment, for simplifying the description, the operand address OA is composed of four bits and the modification data Ai' is composed of two bits, but the invention is not limited to this. FIG. 6 shows relation of the data tables $TA_1$, $TA_2$, $TA_3$ and $TA_4$ capable of being accessed by the instruction format shown in FIG. 5A and the operand address OA. Since the operand address OA is composed of the four bits, in the embodiment, the access of 16 sorts is possible as shown by the address number A11–A44.

Figure 5B:
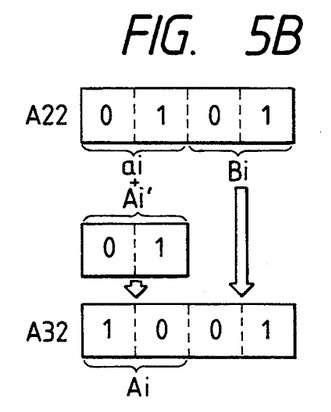

FIG. 5B shows method of obtaining the operand address corresponding to the address number A32 using the instruction format shown in FIG. 5A. In the embodiment, the operand address ai (01) in the instruction format and the modification data Ai' (01) in the instruction format are added. Thereby the upper two bits Ai (10) of the operand address corresponding to the address number A32 are formed. Modification is not made regarding the lower two bits Bi (01).

Figure 5C:
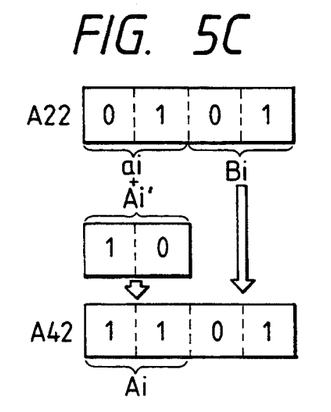

FIG. 5C shows method of obtaining the operand address corresponding to the address number A42. In the embodiment, the operand address ai (01) in the instruction format and the modification data Ai' (10) in the instruction format are added. Thereby the upper two bits Ai (11) of the operand address corresponding to the address number A42 is formed. Modification is not made regarding the lower two bits Bi (01).

Since the instruction format shown in FIG. 5A includes the modification data, a plurality of modification registers $MR_1$–$MR_n$, as shown in FIG. 2, need not be installed in the communication LSI.

The above-mentioned embodiments have following effects.

(1) When communication processing is performed through the serial input/output circuit SI/O to the prescribed terminal equipment, the instruction word required to obtain the protocol control data such as data relating to sort of the terminal equipment or data relating to state of the line from a prescribed one among the plurality of data tables $TA_1$ through $TA_n$ includes: (1) code for selecting the modification register (2) the operation address OA holding the prescribed address data Bi corresponding to address of the data tables. The content of the modification register selected by a code for selecting the modification register and a part of the operand address (e.g., prescribed upper bits) are subjected to an adding processing, thereby the effective address to access the necessary data table is supplied. Consequently, execution of the instruction required to obtain data for controlling the prescribed protocol by accessing the data table can be attained by single software step. Also the adding processing need not be effected to a part of the operand OA (e.g., prescribed lower bits). Accordingly, when the bit number of the operand address OA is large and the adding processing must be effected in plural times, the adding processing of zero-bit data to the prescribed lower bits may be omitted. Thereby, the high speed access to the data table becomes possible.

(2) According to the effects of (1), when prescribed data table is accessed among a plurality of data tables at random, high speed access can be realized.

(3) According to effects of (1), since high speed processing can be realized for communication between one switching station to control a plurality of terminal equipment and a prescribed terminal equipment, the high speed access of the protocol control data table required in the communication protocol LSI to support the plurality of terminal equipment in sequence at random can be satisfied.

(4) According to the effects of (1), the number of software development steps in the communication protocol control LSI can be reduced.

(5) If upper bits to be modified in the operand address included in the instruction word are made the prescribed address data other than zero, any data table group can be easily accessed among a plurality of data table groups without varying the stored data of the modification register or the modification data included in the instruction word. In other words, the data table can be easily expanded beyond the real address space.

The invention by the inventor has been described specifically based on the embodiments. However, the invention is not limited to the embodiments, and various modifications may be made without departing from the spirit of the invention.

For example, in the above embodiments, the bit number of the modification register is made equal to the bit number of the operand address included in the instruction word. However, the invention is not limited to this, but the address data corresponding to the relative address common within respective data tables can be decreased by the bit number at most. Also the bit constitution of the operand address is not limited to the embodiments but may be varied to suitable bit number. Corresponding to this, the bit constitution of the modification register also can be varied.

In the description, the invention by the inventor has been mainly described in the case of the application to the communication protocol LSI being the utilization field as the background of the invention. However, the invention is not limited to this and may be applied to various systems wherein a plurality of data tables must be accessed in sequence at random. The invention can be applied at least to systems which modify the address part of an instruction word.

What is claimed is:

1. A method of obtaining an effective address for accessing a plurality of data tables by a microprocessor, the data tables including protocol data operands, wherein each data table is associated with a corresponding terminal equipment and defines a protocol for communicating with the corresponding terminal equipment, and wherein communication with the terminal equipment is effected by the microprocessor with access to the effective address of a required protocol data operand within one of the data tables for said protocol for communicating, the method comprising the steps of:

storing an n bits operand address in an instruction in an n bit first storage device, the n bits operand address comprising a relative protocol data operand address within each of the data tables, the relative address in each of the data tables having a same kind of data for effecting a same kind of data processing operation;

storing at least one m bits address modifier in an m bit modification register in a microprocessor where m is an integer less than n, the m bits address modifier comprising an identifier of a one of the plurality of data tables and being made the object of operation in an arithmetic logic unit included in the microprocessor;

transferring one m bit address modifier to a second storage device;

adding with the arithmetic logic unit, the n bit protocol data operand address from the first storage device to the m bit address modifier of the second storage device to produce an n bit effective address comprising a physical address of the required protocol data operand for the one data table; and, communicating by the microprocessor with the corresponding terminal equipment by accessing the effective address of the required protocol data operand within the one of the data tables.

2. In a microprocessor comprising a program memory for storing instructions therein, a data memory for storing data therein comprising a protocol for communicating with selected terminal equipment, and a central processing unit for processing data in accordance with operation of the instructions, the data memory including a plurality of data tables each having a predetermined storage capacity and a predetermined format wherein each of the plurality has a same kind of data at a relative address therein, a method of communicating with the selected terminal equipment by accessing an address within one of the data tables comprising the steps of:

reading out a predetermined instruction from the data memory, the predetermined instruction including an operation code and an operand address, the operand address being of n bits and indicating a corresponding data table relative address of a protocol data operand wherein the same kind of data effects a same kind of data processing operation in each of the data tables;

accessing one of a plurality of m bit address registers which store m bit address data in response to the operation code and which identify a corresponding data table, where m is less than n;

modifying the n bit operand address by adding with an arithmetic logic unit in the microprocessor the m bit address data to the m upper bits of the n bit operand address to provide an effective address of n bits for a protocol data operand required for communicating with the selected terminal equipment;

accessing the data memory using the effective address; and, communicating by the microprocessor with the selected terminal equipment by accessing the effective address of the required protocol data within the corresponding data tables.

3. A method of communicating between a processor and a plurality of terminal equipment units by modifying an operand address in a communication protocol control system which accesses a plurality of data tables wherein a one of the plurality of data tables corresponds to a one of the plurality of terminal equipment units, the plurality of data tables having identical relative addresses storing a same kind of data corresponding to each of the relative addresses in each of the plurality of data tables, the data comprising protocol data operands, the method comprising steps of:

retrieving an instruction word which includes an operation code and a protocol data operand address, the operand address having first upper bits which are set to zero and first lower bits which comprise a one of the relative addresses on the data tables;

selecting a modification register based on the operation code, the modification register storing data that has second upper bits which designate the particular one of the plurality of data tables and second lower bits which are set to zero;

combining the first upper bits and the first lower bits with the second upper bits and the second lower bits, respectively, to create an effective address for accessing a corresponding address on the particular one of the plurality of data tables, wherein efficiency of processing is increased with only one combining step to access data from desired data tables; and, communicating by the processor with the one of the plurality of terminal equipment units by accessing the effective address within the particular one of the plurality of data tables.

4. A communication controller for use with a number of terminal equipment storage units in which each unit has a predetermined memory storage, the controller comprising a program memory for storing instructions therein, a data memory for storing protocol data operands in a plurality of data tables therein, and a central processing unit for processing data in accordance with operation codes of the instructions, a number of the data tables corresponding to a number of terminal equipment units, and the data tables having a predetermined format wherein like related addresses in each of the data tables have a same kind of protocol data operands for corresponding terminal equipment units, a method of communicating with one of the terminal equipment units using a defined protocol by accessing the address of a required protocol data operand within one of the data tables comprising steps of:

reading out a selected one of the instructions from the program memory, the selected instruction including a selected protocol data operand address being of n bits and indicating a corresponding data table address;

accessing one of a plurality of m bit address registers which store m bit address data identifying a one of the relative data tables in response to the selected instruction, where m is less than n;

modifying the n bit selected protocol data operand address by adding with an arithmetic logic unit in the central processing unit, the m bit address data to m upper bits of the n bit selected protocol data operand address to provide an effective address of n bits; and, accessing the data memory using the effective address.

5. In a communication system comprising a plurality of terminal equipment units which have a predetermined memory storage, a communication protocol controller coupled to the plurality of terminal equipment units via transmission and reception lines, a host processor coupled to the communication protocol controller, and a main memory coupled to the communication protocol controller, the protocol controller controlling data transfer between one of the plurality of terminal equipment units and the main memory, the controller comprising a program memory for storing instructions, a data memory for storing protocol data operands in a plurality of data tables, and a central processing unit for processing data in accordance with operation codes of the instructions, a number of said data tables corresponds to a number of the terminal equipment units, each of which has a predetermined format wherein like relative addresses in each of the data tables have a same kind of protocol data operands for corresponding terminal equipment units, a method of communicating with one of the terminal equipment units using a defined protocol by accessing an address of a required protocol data operand within one of the data tables comprising steps of:

reading out a selected instruction from the program memory, the selected instruction including an operation code and a protocol data operand address, the operand address being of n bits and indicating a corresponding data table relative address;

accessing one of a plurality of m bit address registers which store m bit address data identifying a corresponding one of the data tables in response to the selected instruction, where m is less than n;

modifying the n bit protocol data operand address by adding with an arithmetic logic unit in the central processing unit, the m bit address data to m upper bits of the n bit protocol data operand address to provide an effective address of n bits; and, accessing the data memory using the effective address.

* * * * *